United States Patent [19]

Egawa

[11] Patent Number: 4,975,920
[45] Date of Patent: Dec. 4, 1990

[54] RF DISCHARGE EXCITATION LASER APPARATUS

[75] Inventor: Akira Egawa, Yamanashi, Japan

[73] Assignee: Fanuc Limited, Yamanashi, Japan

[21] Appl. No.: 503,149

[22] Filed: Mar. 30, 1990

Related U.S. Application Data

[63] Continuation of Ser. No. 210,042, Jun. 13, 1988, abandoned.

[63] Continuation of Ser. No. 210,042, filed as PCT JP87/00771 on Oct. 14, 1987, published as WO88/02936 on Apr. 21, 1988, abandoned.

[30] Foreign Application Priority Data

| Oct. 14, 1986 | [JP] | Japan | 61-242072 |
| Oct. 14, 1986 | [JP] | Japan | 61-242074 |
| Oct. 15, 1986 | [JP] | Japan | 61-243204 |
| Oct. 15, 1986 | [JP] | Japan | 61-243211 |
| Nov. 12, 1986 | [JP] | Japan | 61-267722 |

[51] Int. Cl.$^5$ ............................................. H01S 3/00
[52] U.S. Cl. ....................................... 372/38; 372/82; 372/83; 372/92
[58] Field of Search .................. 372/88, 87, 82, 38, 372/81

[56] References Cited

U.S. PATENT DOCUMENTS

| 4,112,392 | 9/1978 | Anderson et al. | 372/82 |
| 4,352,188 | 2/1982 | Griffith | 372/82 |
| 4,373,202 | 2/1983 | Lakmann et al. | 372/64 |
| 4,618,961 | 10/1986 | Sutter, Jr. | 372/87 |
| 4,761,786 | 8/1988 | Baer | 372/72 |

Primary Examiner—Léon Scott, Jr.
Attorney, Agent, or Firm—Armstrong, Nikaido Marmelstein, Kubovcik & Murray

[57] ABSTRACT

A matching means (2) is arranged in a power source portion (5) including an RF power source (1), an output impedance ($Z_0$) of the RF power source (1) is matched by the matching means with a impedance ($Z_L$) of a laser tube (4) connected through a power transmitting means (3). Therefore, the laser tube (4) arranged in a laser emitting portion (6) is effectually supplied with an RF power generated by the RF power source (1), and a stable laser beam can be emitted from the laser tube (4) with a high efficiency.

9 Claims, 8 Drawing Sheets

RF DISCHARGE EXCITATION LASER APPARATUS

This application is a continuation of application Ser. No. 210,042 filed as PCT JP87/00771 on Oct. 14, 1987, published as W088/02936 on Apr. 21, 1988 now abandoned.

TECHNICAL FIELD

The present invention relates to an RF discharge excitation laser apparatus for generating a laser output upon an application of RF power to a laser tube.

BACKGROUND ART

In a conventional RF discharge excitation laser apparatus, a voltage of, for example, several MHz to several hundreds of MHz, is applied across electrodes of a laser tube to generate a laser output. A matching circuit is arranged between an RF power source and the laser tube. The matching circuit matches an output impedance $Z_0'$ of the RF power source with an impedance (impedance of the laser tube) $Z_L'$ between the electrodes of the laser tube, and an output voltage from the RF power source is effectively transmitted to the laser tube.

In the conventional RF discharge excitation laser apparatus described above, a discharge in a ceramic tube is produced by applying an RF voltage to the laser tube, which discharge excites the laser gas in the laser tube so that a laser beam is emitted.

Note, conventionally, a low-output type RF discharge excitation laser apparatus is used, and thus a ratio between the output impedance $Z_0'$ of the RF power source 101 the impedance $Z_L'$ of the laser tube is relatively low (for example, $Z_0'/Z_L'=2$ to 5), and therefore, matching between the RF power source and the laser tube can be obtained by one matching circuit. More specifically, the conventional RF discharge excitation laser apparatus is provided with a laser tube having an inner diameter of the interior thereof of several millimeters, and when hundreds of volts are applied to the electrodes of such a laser tube, a laser output can be obtained An output voltage of the RF power source is, for example, 200 volts, and a match with the laser tube having an operating voltage of several hundreds of volts can be obtained by one matching circuit.

Recently, however, an RF discharge excitation laser apparatus has been developed which obtains a high-output laser beam upon an application of an RF voltage of several kilovolts to the laser tube. In an RF discharge excitation laser apparatus having such a high output, the inner diameter of the interior of the laser tube is several tens of millimeters (for example, 30 millimeters), and a voltage applied between the two electrodes of the laser tube is several kilovolts. For this reason, the ratio between the output impedance $Z_0'$ of the RF power source and impedance $Z_L'$ of the laser tube is increased (for example, $Z_0'/Z_L'>10$), and it is difficult to match the output impedance $Z_0'$ of the RF power source with the impedance $Z_L'$ of the laser tube with only one matching circuit.

DISCLOSURE OF THE INVENTION

The object of the present invention is to match an output impedance of an RF power source with an input impedance of a laser tube, and to generate a stabilized laser beam from the laser tube with a high efficiency.

According to the present invention, there is provided an RF discharge excitation laser apparatus comprising a power source portion, a laser emitting portion, and a power transmitting means for transmitting a power source generated by the power source portion to the power transmitting means, characterized in that the RF discharge excitation laser apparatus comprises: an RF power source, arranged in the power source portion, for generating an RF voltage; a laser tube, arranged in the laser emitting portion, for emitting a laser beam; and a matching means, arranged in the power source portion, for matching an output impedance of the RF power source with an impedance of the laser tube connected through the power transmitting means.

According to the RF discharge excitation laser apparatus of the present invention having the above described configuration, the matching means is arranged in the power source portion having the RF power source, and the output impedance of the RF power source is matched with the impedance of the laser tube connected through the power transmitting means. Therefore, the RF power generated from the RF power source is effectively transmitted to the laser tube arranged in the laser emitting portion, so that a stabilized laser beam is generated from the laser tube with a high efficiency.

BEST MODE FOR CARRYING OUT THE INVENTION

First, the problems of a conventional RF discharge excitation laser apparatus will be explained with reference to FIG. 1, and then an explanation of embodiments of an RF discharge excitation laser apparatus according to the present invention will be given.

Figure 1:
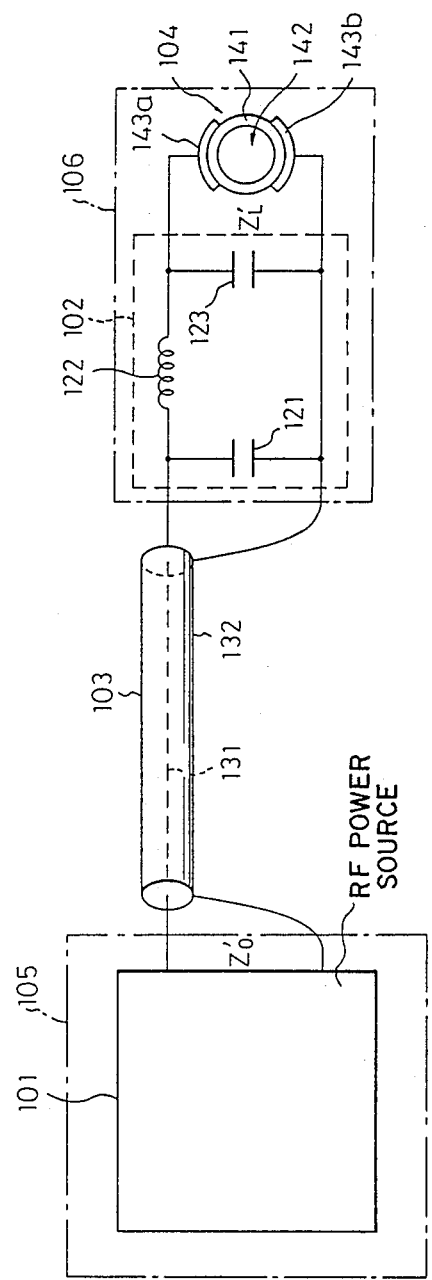
FIG. 1 is a schematic circuit diagram showing a conventional RF discharge excitation laser apparatus.

FIG. 1 is a schematic circuit diagram showing a conventional RF discharge excitation laser apparatus. As shown in FIG. 1, the conventional RF discharge excitation laser apparatus comprises an RF power source 101, a coaxial cable 103, a matching circuit 102, and a laser tube 104. The RF power source 101 is arranged in a power source unit (power source portion) 105 used for outputting an RF voltage to the laser tube 104. An output voltage of the RF power source 101 is applied to the matching circuit 102 arranged in a laser output unit 106 through the coaxial cable 103. In this conventional arrangement, the coaxial cable 103 is inserted between the RF power source 101 and the matching circuit 102 because a characteristic impedance of the coaxial cable is 50 Ω to 75 Ω and a perfect match cannot be established unless the coaxial cable is connected to the output side of the RF power source 101 having a low impedance.

The matching circuit 102 matches an output impedance $Z_0'$ of the RF power source 101 through the coaxial cable 103 with an impedance $Z_L'$ of the laser tube 104, so that the output voltage of the RF power source 101 can be effectively transmitted to the laser tube 104. The matching circuit 102 is a π matching circuit comprising a capacitor 121 connected in parallel with an internal conductor 131 and an external conductor 132, a capacitor 123 connected to two electrodes 143a and 143b of the laser tube, and a coil 122 connected in series between the internal conductor 131 of the coaxial cable and the electrode 143a of the laser tube.

In this conventional RF discharge excitation laser apparatus, a discharge occurs in an interior 142 of a ceramic tube 141 upon application of an RF voltage to the electrodes 143a and 143b, and carbon dioxide gas in the interior 142 of the ceramic tube is excited by this discharge. That is, in this RF discharge excitation laser apparatus, $CO_2$ molecules are excited to a high level vibration state, light emitted by the $CO_2$ molecules is reflected and resonated by two parallel reflecting mirrors arranged on both sides of the laser tube 104, and part of the light is extracted as a laser output.

The laser output unit 106 including the laser tube 104 and the matching circuit 102 is located, for example, at an arm portion of an industrial robot. When the RF discharge excitation apparatus is to be adjusted due to a deterioration over a period of time, the RF power source 101 arranged in the power source unit 105 and the matching circuit 102 in the laser output unit 106 located, for example, at an arm portion of an industrial robot, must be adjusted, and therefore, a maintenance problem arises.

When the matching circuit 102 is arranged at the position of the laser tube 104, a loop for generating noise is enlarged, and the exterior of the laser output unit 106 must be completely shielded to block this noise. Thus, for example, the structure of the arm position of the industrial robot including the laser output unit 106, becomes heavy and complicated.

Next, with reference to the drawings, embodiments of an RF discharge excitation laser apparatus according to the present invention will be described.

Figure 2:
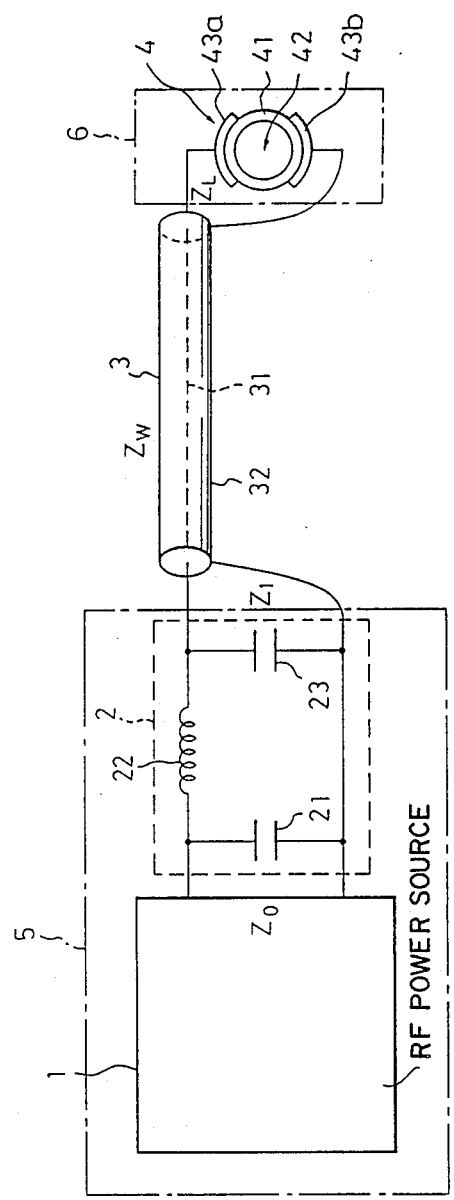
FIG. 2 is a schematic circuit diagram showing a first embodiment of an RF discharge excitation laser apparatus according to the present invention.

FIG. 2 is a schematic circuit diagram showing a first embodiment of an RF discharge excitation laser apparatus according to the present invention. In this first embodiment of an RF discharge excitation laser apparatus according to the present invention, as shown in FIG. 2, a voltage having a frequency of several MHz is applied between two electrodes 43a and 43b of a laser tube 4, to obtain a laser output. The laser apparatus mainly comprises an RF power source 1, a matching circuit 2, a coaxial cable 2, and the laser tube 4. The RF power source 1 is arranged in a power source unit (power source portion) 5 and outputs an RF voltage of several hundreds of volts. This output voltage is applied to the input of the matching circuit 2 arranged in the power source unit 5. The output of the matching circuit 2 is connected to one end of the coaxial cable 3, and the other end of the coaxial cable 3 is connected to the laser tube 4.

The matching circuit 2 is, for example, a π matching circuit comprising a capacitor 21 connected in parallel with the outputs of the RF power source 1, a capacitor 23 connected in parallel with an internal cable 3, and a coil 22 connected in series between one output of the RF power source 1 and the internal conductor 31 of the coaxial cable 3. The π matching circuit 2 is arranged in the power source unit 5 including the RF power source 1. Accordingly, if the RF discharge excitation laser apparatus must be adjusted due to deterioration over a period of time, only the power source unit 5 side need be disassembled to adjust the laser.

The matching circuit 2 is arranged to match an output impedance $Z_0$ of the RF power source 1 with an impedance $Z_L$ of the laser tube 4 through the coaxial cable 3. The impedance $Z_L$ is changed in the range of, for example, 500 Ω to 3 KΩ, in accordance with an output state of the laser beam. The impedance $Z_L$ of the laser tube 2 cannot be perfectly matched with an output impedance $Z_L$ of the matching circuit 2, and in addition, a characteristic impedance $Z_W$ of the coaxial cable 3 is, for example, 50 Ω or 75 Ω, and is greatly different from the impedance $Z_L$ of the laser tube 2. Nevertheless, even if an RF voltage is reflected from the laser tube 4 to the matching circuit 2 through the coaxial cable 3 when a perfect match between the output impedance $Z_L$ of the laser tube 4 and the output impedance $Z_1$ of the matching circuit 2 and the characteristic impedance $Z_W$ of the coaxial cable 3 is not established, the RF voltage reflected from the laser tube 4 to the matching circuit 2 through the coaxial cable 3 is reflected again to the laser tube 4 through the coaxial cable 3, and therefore, the output power of the RF power source 1 can be supplied to the laser tube 4 with a high efficiency.

The laser tube 4 is arranged in a laser output unit (laser emitting portion) 6 and comprises a tube 41 made of quartz glass and the electrodes 43a and 43b arranged at the upper and lower ends of the quartz glass tube 41. The output voltage of the RF power source 1 is boosted by the matching circuit 2 and is applied to the electrodes 43a and 43b of the laser tube 4 through the coaxial cable 3. An RF discharge occurs in an interior 42 of the quartz glass tube 41 due to the RF voltage applied to electrodes 43a and 43b of the laser tube, and this glow discharge causes an excitation of
carbon dioxide gas (a gas mixture of $CO_2$, $N_2$, and He in practice) in the interior 42 of the quartz glass tube.

That is, the $CO_2$ molecules in the interior 42 of the quartz glass tube are excited to a high level vibration state. In the process of changing the molecular high level vibration state to a molecular low level vibration state, $CO_2$ molecules emit light having two parallel reflecting mirrors (not shown) arranged on both sides of the laser tube 4, and part of the light is extracted as a laser output.

Since only the laser tube 4 is arranged in the laser output unit 6 located, for example, at an arm portion of an industrial robot, a noise loop is limited to connection portion between the electrodes 43a, 43b of the laser tube 4 and coaxial cable 3, and accordingly, noise is rarely generated by the laser output unit 6, and thus the exterior of the laser output unit 6 need not be completely shielded. Therefore, for example, the arm portion of the industrial robot including the laser output unit 6, does not need a complex structure.

Figure 3:
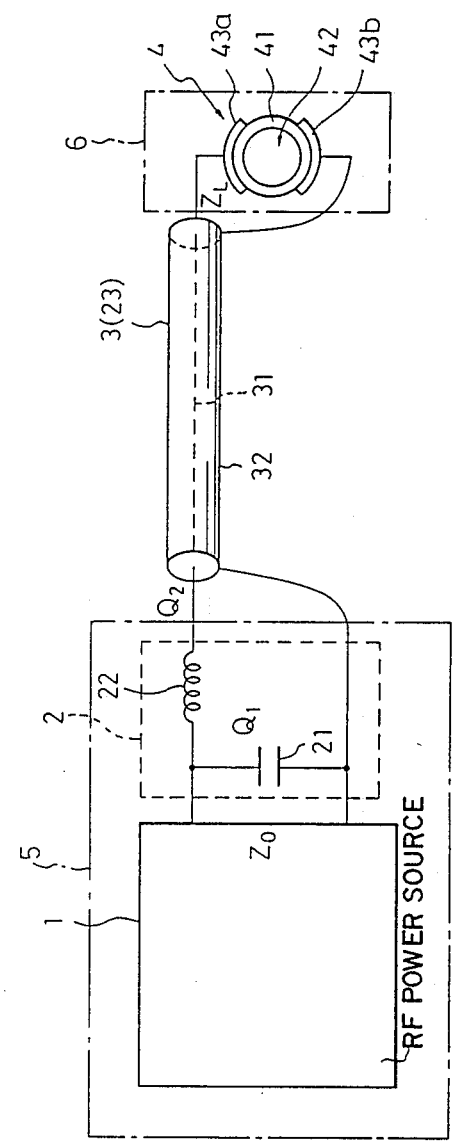
FIG. 3 is a schematic circuit diagram showing a modification of the embodiment of the RF discharge excitation laser apparatus shown in FIG. 2.

FIG. 3 is a schematic circuit diagram showing a modification of the embodiment of the RF discharge excitation laser apparatus shown in FIG. 2. The RF discharge excitation laser apparatus shown in FIG. 3 uses a coaxial cable 3 as the capacitor 23 in the matching circuit 2 of the RF discharge excitation laser apparatus shown in FIG. 2. For example, if the length of the coaxial cable 3 is 1.5 meters, and the capacitance thereof is 150 pF, it is assumed that a 150-pF capacitor 23 is connected to a laser tube 4, and the values of a capacitor 21 and a coil 22 in the matching circuit 2 are determined by this assumption. In this manner, when a coaxial cable 3 is used as the capacitor 23 in the matching circuit 2, a capacitance $Q_2$ on the laser tube 4 side of the matching circuit 2 can be minimized. In this embodiment, an output impedance $Z_0$ of an RF power source 1 is small, an impedance $Z_L$ of the laser tube 4 is large, and a high voltage is applied to the laser tube 4, and under these conditions, a capacitance $Q_1$ of the capacitor 21 in the matching circuit 2 can be effectively decreased. That is, the capacitor 21 having a large capacitance $Q_1$ and a high breakdown voltage cannot be easily obtained, but if the coaxial cable 3 is used as the capacitor 23 in the matching circuit 2, the capacitance $Q_1$ of the capacitor 21 can be reduced, compared with the case wherein the capacitor 23 is arranged in the matching circuit 2, as in the embodiment of FIG. 2. The arrangement and operation of the RF discharge excitation laser apparatus according to this embodiment are the same as those of the embodiment shown in FIG. 2, and thus a detailed description thereof will be omitted.

In the first embodiment of the RF discharge excitation laser apparatus according to the present invention, as described above, the matching circuit is arranged in the power source unit including the RF power source, and the output of the matching circuit is connected to the laser tube through the coaxial cable. Therefore, the maintenance and structure of the laser tube location can be simplified, and the weight and the number of components of the laser apparatus can be reduced, thereby improving the reliability of the laser.

Figure 4:
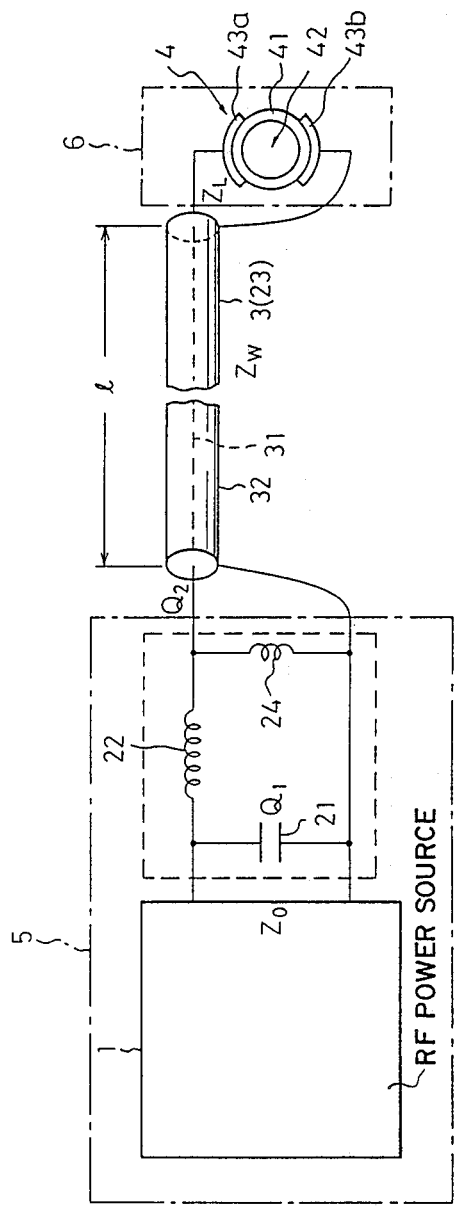
FIG. 4 is a schematic circuit diagram showing a second embodiment of an RF discharge excitation laser apparatus according to the present invention.

FIG. 4 is a schematic circuit diagram showing a second embodiment of an RF discharge excitation laser apparatus according to the present invention. In the second embodiment of the RF discharge excitation laser apparatus according to the present invention, as shown in FIG. 4, a voltage having a frequency of, for example, several MHz, is applied between two electrodes 43a and 43b of a laser tube 4 to obtain a laser output. The laser apparatus mainly comprises an RF power source 1, a matching circuit 2, a coaxial cable 3, and the laser tube 4. The RF power source 1 is arranged in a power source unit 5 and outputs an RF voltage of, for example, several hundreds of volts. A capacitor 21 is connected in parallel with the output terminals of the RF power source 1, and a coil 22 is connected in series with one of the output terminals. One end of an internal conductor 31 and one end of an external conductor 32 of the coaxial cable 3 are connected to one output terminal of the RF power source 1 through the coil 22 and the other output terminal thereof, respectively. A coil 23 is connected in parallel with one output terminal of the RF power source 1 through the coil 22 and the other output terminal thereof. The other end of the internal conductor 31 and the other end of the external conductor 32 of the coaxial cable 3 are connected to the electrodes 43a and 43b of the laser tube 4, respectively, and thus an output voltage of the RF power source 1 is applied to the laser tube 4.

The matching circuit 2 for matching the RF power source 1 with the laser tube 4 is a $\pi$ matching circuit comprising the capacitor 21 connected in parallel with outputs of the RF power source 1, the coil 22 connected in series between one output terminal of the RF power source 1 and the internal conductor 31 of the coaxial cable 3, the coil 23 connected to the internal and external conductors 31 and 32 of the coaxial cable 3, and an electrostatic capacitance $Q_2$ of the coaxial cable 3. The electrostatic capacitance $Q_2$ of the coaxial cable 3 having a length l is reduced by the coil 23, and thus an electrostatic capacitance $Q_1$ of the capacitor 21 can be reduced.

In the matching circuit 2, when the length l of the coaxial cable 3 is increased, the electrostatic capacitance $Q_2$ of the coaxial cable 3 is increased. Therefore, the inductance of the coil 23 must be increased in accordance with the length of coaxial cable 3. The output voltage from the RF power source 1 can be satisfactorily boosted, and an impedance $Z_0$ of the RF power source 1 can be accurately matched with an impedance $Z_L$ of the laser tube 4 through the coaxial cable 3, and consequently, the output power of the RF power source 1 can be effectively supplied to the laser tube 4. More specifically, for example, the distance l of the coaxial cable 3 having a characteristic capacitance of about 100 pF/meter is given as 3 meters (the electrostatic capacitance $Q_2$ of the coaxial cable 3 is about 300 pF), and the inductance of the coil 23 is set to be 30 $\mu$H. In this case, the electrostatic capacitance $Q_1$ of the capacitor 21 in the matching circuit 2 can be set to 2,000 pF, and therefore, the impedance $Z_0$ of the RF power source can be accurately matched with the impedance $Z_L$ of the laser tube 4 through the coaxial cable 3, and thus the output power from the RF power source 1 can be effectively supplied to the laser tube 4.

The impedance $Z_L$ of the laser tube 4 is, in practice, changed over the range of 500 $\Omega$ to 3 k$\Omega$, in accordance with an operating state of the RF discharge excitation laser apparatus. Accordingly, the impedance $Z_L$ of the laser tube 4 is not always matched with an output impedance of the matching circuit 2 including the electrostatic capacitance $Q_2$ of the coaxial cable, but a perfect match can be established for an operating point of the normally operated laser tube 4. Note, a characteristic impedance $Z_W$ of the coaxial cable 3 is, for example, 50 $\Omega$ or 75 $\Omega$, and is greatly different from the impedance $Z_L$ of the laser tube 2, but even if an RF voltage is reflected from the laser tube 4 to the matching circuit 2 through the coaxial cable 3 when a perfect match between the output impedance $Z_L$ of the laser tube 4, and the output impedance of the matching circuit 2 and the characteristic impedance $Z_W$ of the coaxial cable 3 is not established, the reflected RF voltage is reflected again to the laser tube 4 through the coaxial cable 3, and therefore, the output power of the RF power source 1 can be supplied to the laser tube 4 with a high efficiency, and thus no significant problems arise.

Since only the laser tube 4 is arranged in the laser output unit 6 located, for example, at an arm portion of an industrial robot, a noise loop is limited to connection portions between the electrodes 43a and 43b of the laser tube 4 and the coaxial cable 3, and accordingly, noise is rarely generated by the laser output unit 6, and thus the exterior of the laser output unit 6 does not need to be completely shielded. Therefore, for example, the arm portion of the industrial robot including the laser output unit 6 does not need a complex structure. Even if a distance to the arm portion of the industrial robot is long and the output voltage from the RF power source 1 is supplied through the coaxial cable 3, a perfect match between the RF power source 1 and the laser tube 4 through the coaxial cable 3 can be established, and thus the output power of the RF power source 1 can be effectively supplied to the laser tube 4.

In the second embodiment of the RF discharge excitation laser apparatus according to the present invention, as described above, the inductance element is connected to the RF power source side of the coaxial cable, the electrostatic capacitance of the coaxial cable is reduced by the inductance element, and the capacitance of the capacitance element connected in parallel with the output terminals of the RF power source can be reduced. Therefore, the compact matching circuit can accurately match the RF power source with the laser tube through the coaxial cable.

Figure 5:
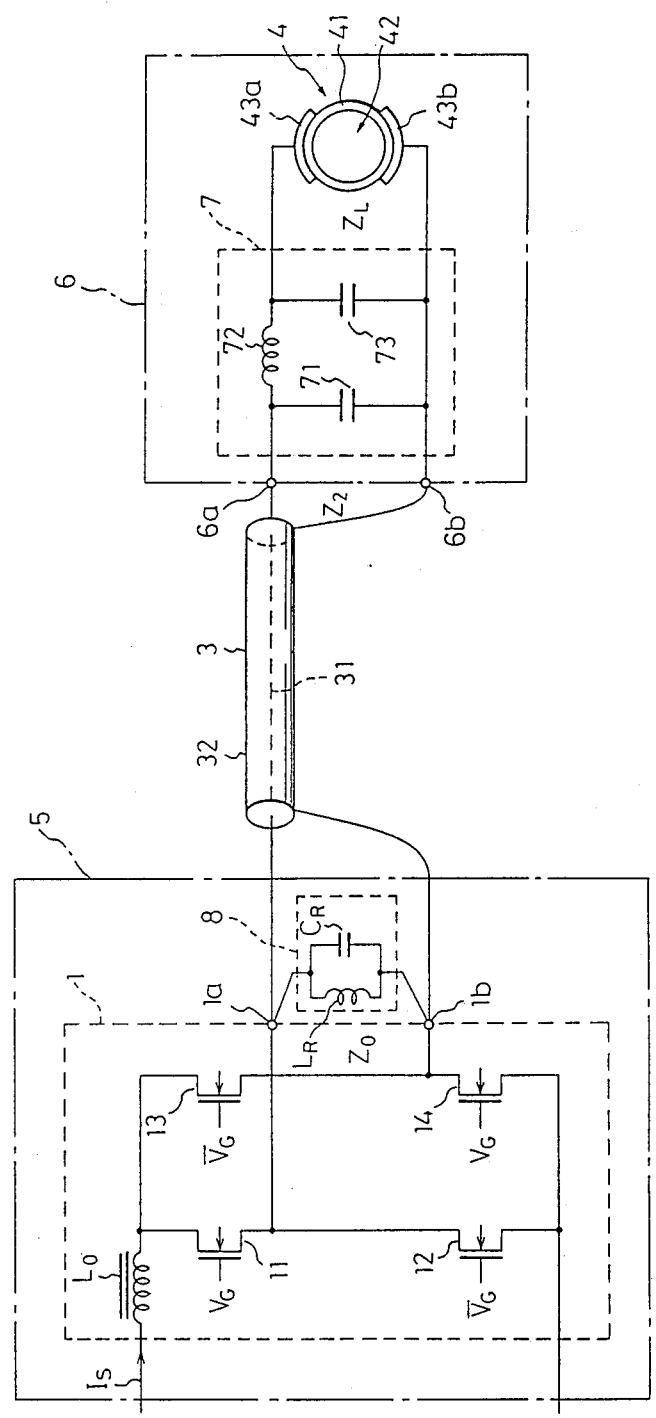
FIG. 5 is a schematic circuit diagram showing a third embodiment of an RF discharge excitation laser apparatus according to the present invention.

FIG. 5 is a schematic circuit diagram showing a third embodiment of an RF discharge excitation laser apparatus according to the present invention. In FIG. 5, reference numeral 1 denotes an RF current inverter as the RF power source. The current inverter 1 comprises a choke coil $L_0$ inserted in series with the inverter circuit, and four switching N-channel MOS (Metal-Oxide-Semiconductor) transistors 11, 12, 13, and 14. The choke coil $L_0$ is used to maintain an input current $I_S$ and acts as a DC power portion to obtain a constant current power source. A switching circuit is obtained by a parallel connection with the choke coil $L_0$. The switching circuit comprises a series circuit of transistors 11 and 12, and a series circuit of the transistors 13 and 14. A connecting point between the transistors 11 and 12 is connected to an output terminal 1a, and a connecting point between the transistors 13 and 14 is connected to an output terminal 1b. Drive voltages $V_G$, $V_G$, $V_G$, and $V_G$ having the same frequency $f_0$ are input to the gates of the transistors 11 to 14, respectively, and the pair of transistors 11 and 14 and the pair of transistors 12 and 13 are alternately turned ON/OFF in accordance with the frequency $f_0$ of the drive signal. An RF voltage corresponding to the frequency $f_0$ appears between the output terminals 1a and 1b.

Reference numeral 8 denotes a parallel resonance circuit (tank circuit). The parallel resonance circuit 8 is connected in parallel with the output terminals 1a and 1b, and comprises a parallel-connected coil $L_R$ and a parallel-connected capacitor $C_R$. Therefore, the frequency $f_0$ of the RF signal appearing across the terminals 1a and 1b and the parameters of the respective elements have the following relationship:

$$f_0 = \frac{1}{2\pi L_R \cdot C_R}$$

the tank circuit 8 has a high Q (quality factor: Q=10 in this embodiment) and is operated such that the impedance, when viewed from the output terminals 1a and 1b, to the load consists of only a resistance component, for example, the impedance does not substantially include the reactance component (invalid component). Note, the current inverter circuit 1 and the tank circuit 8 are arranged in a power source unit 5.

Reference numeral 3 denotes a coaxial cable for electrically connecting the power source side to the load side. One output terminal 1a of a current inverter 1 is connected to one input terminal 6a (load side) of a laser output unit 6 through a central conductor 31 of the coaxial cable, and the other output terminal 1b of the power source 1 is connected to the other input terminal 6b of the laser output unit 6 through an external conductor 32. Reference numeral 4 denotes a laser tube, and the laser tube 4 comprises a pair of electrodes 43a and 43b to which an RF voltage is applied, and a tube, for example, a quartz tube 41, used for the discharge. A π matching circuit 7 is inserted between the electrodes 43a and 43b and the input terminals 6a and 6b. The matching circuit 7 includes a coil 72 at the central portion thereof and capacitors 71 and 72 at both ends thereof. The π matching circuit 7 matches an impedance $Z_2$ obtained, when viewed from the terminals 6a and 6b to the power source side, with an impedance $Z_L$ between the electrodes 43a and 43b of the laser tube 4. Therefore, unless the impedance is changed between the power source 1 and the laser tube 6, the RF output voltage of the power source 1 can be effectively transmitted to the laser tube 6.

According to the third embodiment of the present invention, when the tank circuit 8 is operated in the parallel resonance mode, for example, when the RF signal having the frequency $f_0$ appears between the output terminals 1a and 1b of the inverter circuit 1, an impedance $Z_0$ obtained, when viewed from the terminals 1a and 1b to the power source side, is determined by the impedance of the tank circuit 8. Even if the impedance in the load side from the output terminals 1a and 1b occurs after the installation position of the power source or laser tube is changed or the cable layout is changed, the change will be small enough to be ignored compared with the impedance of the tank circuit 8 itself. The power source is not adversely affected by a change in impedance, and this indicates that a degradation of the matching circuit 7, which is caused by a load variation, does not adversely affect the power operation. Therefore, unlike the conventional apparatus, the parameters of respective elements in the matching circuit need not be precisely adjusted, or a perfect match need not be established, and therefore, complex adjustment operations can be omitted.

In the third embodiment of the RF discharge excitation laser apparatus according to the present invention, as described above, complex adjustment operations are not required and load variations can be withstood.

Figure 6:
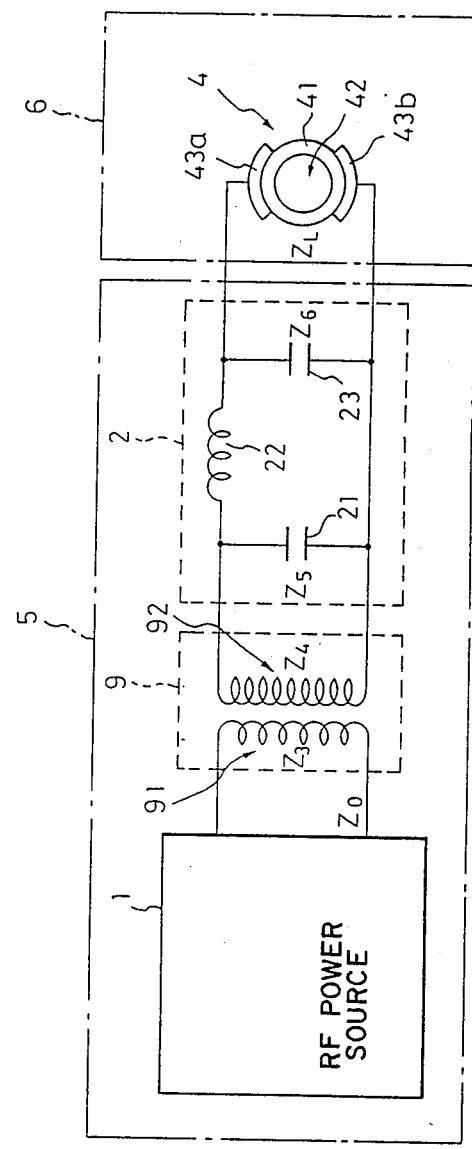
FIG. 6 is a schematic circuit diagram showing a fourth embodiment of an RF discharge excitation laser apparatus according to the present invention.

FIG. 6 is a schematic circuit diagram showing a fourth embodiment of an RF discharge excitation laser apparatus according to the present invention. As shown in FIG. 6, the fourth embodiment of an RF discharge excitation laser apparatus according to the present invention is arranged such that a voltage of, for example, several MHz, is applied between two electrodes 43a and 43b of a laser tube 4 to obtain a laser output. The laser apparatus of this embodiment mainly comprises an RF power source 1, a boosting transformer 9, a matching circuit 2, and the laser tube 4.

The RF power source 1 outputs an RF voltage of several hundreds of volts, and this output voltage is applied to a primary winding 91 of the boosting transformer 9. The matching circuit 2 is connected to a secondary winding 92 of the boosting transformer 9. The output voltage generated by the RF power source 1 and boosted by the boosting transformer 9 is applied to secondary winding 92 of the boosting transformer 9, and an input impedance $Z_3$ of the primary winding 91 of the boosting transformer 9 is matched with an output impedance $Z_0$ of the RF power source 1, and thus the output of the RF power source 1 can be supplied with high efficiency. The boosting transformer 9 can be a compact boosting transformer having a small volume, since the frequency of the voltage for driving the laser tube 4 is a high frequency of, for example, several MHz.

The matching circuit 2 is a $\pi$ matching circuit comprising a capacitor 21 connected in parallel with the outputs of the RF power source 1, a capacitor 23 connected to the two electrodes 43a and 43b of the laser tube (connected in parallel with the laser tube 4), and a coil 22 connected in series between one output of the RF power source 1 and the electrode 43a of the laser tube. In the $\pi$ matching circuit 2, since the capacitances of the capacitors 21 and 23 are properly set, the laser tube 4 can be stably driven, and an input impedance $Z_5$ of the matching circuit 2 is matched with an output impedance $Z_4$ of the secondary winding 92 of the boosting transformer 9, thus preventing unnecessary power loss.

The matching circuit 2 matches the output impedance $Z_4$ of the secondary winding 92 of the boosting transformer 9 with an impedance $Z_L$ of the laser tube 4. An output voltage generated from the RF power source 1 is boosted by the boosting transformer 9 (for example, boosted 2 to 5 times), and the boosted voltage is applied between the two electrodes 43a and 43b of the laser tube 4. The impedance $Z_L$ of the laser tube 4 varies in the range of, for example, 500 $\Omega$ to 3 k$\Omega$, in accordance with an output state of the laser beam. Accordingly, the impedance $Z_L$ of the laser tube 4 cannot be perfectly matched with an output impedance $Z_6$ of the matching circuit 2, but even if perfect match between the impedance $Z_L$ of the laser tube 4 and the output impedance $Z_6$ of the matching circuit 2 is not established and the RF voltage is reflected to the matching circuit 2, the reflected RF voltage is reflected to the laser tube 4 again, and therefore, the power output from the RF power source 1 can be supplied to the laser tube 4 with a high efficiency.

In the fourth embodiment of the RF discharge excitation laser apparatus according to the present invention, as described above, the boosting transformer is arranged between the RF power source and the matching circuit to boost the output voltage from the RF power source, the output voltage of the RF power source is boosted by both the boosting transformer and the matching circuit, and the boosted voltage is then applied to the laser tube. Therefore, the area occupied by the circuit can be reduced due to a simple circuit arrangement, and a stable laser beam can be generated with a high efficiency.

Figure 7:
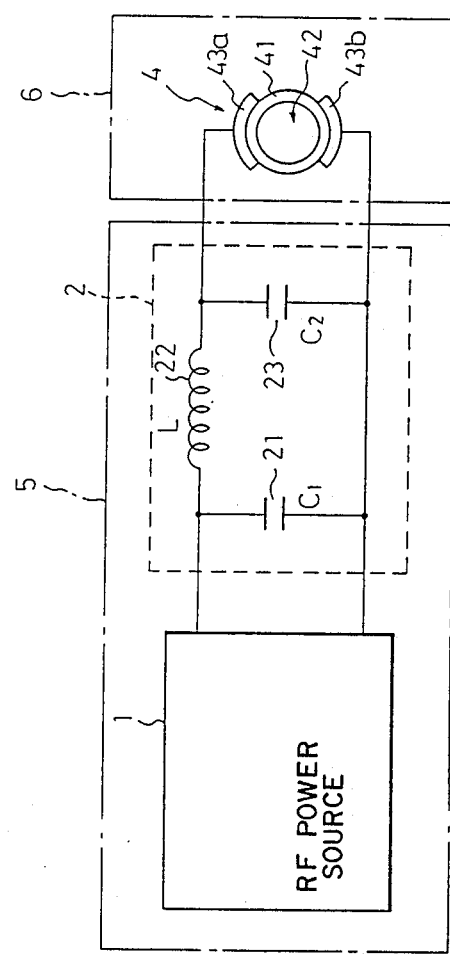
FIG. 7 is a schematic circuit diagram showing a fifth embodiment of an RF discharge excitation laser apparatus according to the present invention.

FIG. 7 is a schematic circuit diagram showing a fifth embodiment of an RF discharge excitation laser apparatus according to the present invention. In the fifth embodiment of the RF discharge excitation laser apparatus according to the present invention, as shown in FIG. 7, a $\pi$ matching circuit 2 is connected between an RF power source 1 and a laser tube 4. The $\pi$ matching circuit 2 comprises input and output capacitive elements (condensers) 21 and 23 (the capacitance thereof being $C_1$ and $C_2$, respectively) and an inductance element 22 having an inductance L.

Note, the impedance $Z_L$ of the laser tube 4 is not limited before an RF voltage is applied or prior to discharge, but when the RF voltage is applied to both electrodes 43a and 43b of the laser tube, and the discharge is started, the initial impedance is set to be, for example, about 3 k$\Omega$. As the power injection progresses, the operating point impedance at the time of operation is decreased to, for example, about 500 $\Omega$. In this manner, the impedance $Z_L$ of the laser tube 4 greatly varies from the state prior to discharge to the operating state at an operating point.

The values of respective constants ($C_1$, $C_2$, and L shown in FIG. 7) of such a matching circuit 2 are set as follows. First, the value of $C_1$ is determined by the following equation:

$$X_1 = \frac{1}{\omega C_1} = \frac{Z_0}{Q} \quad (1)$$

(where $X_1$ is an input capacitive reactance $1/\omega C_1$ (where $\omega$ is an angular frequency) of the matching circuit 2, $Z_0$ is an output impedance of the power source 1, and Q is a constant). In the prior art, the Q value falls within the range of about 3 to 5. By using the $Z_0$, the Q value, and the load impedance $Z_L$, the constants $C_2$ and L are determined by the following equations:

$$X_2 = \frac{1}{\omega C_2} = \frac{Z_L}{\frac{Z_L}{Z_0}(Q^2+1) - 1} \quad (2)$$

$$X_L = \omega L = \frac{QZ_0}{Q^2+1}\left(1 + \frac{Z_L}{QX_2}\right) \quad (3)$$

Figure 8:
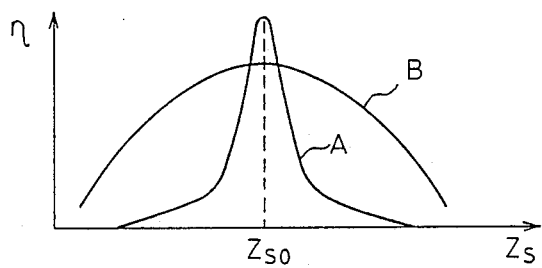
FIG. 8 is a view showing a general relationship between a load impedance and the matching efficiency.

Note, the Q value is kept within the range of about 3 to 5, to decrease output variations caused by the matching errors. FIG. 8 shows a curve showing efficiency variations caused by changes in the load impedance $Z_S$. When a Q value is small, variations in efficiency $\eta$ caused by changes in the load impedance are moderate, taking the matching point (point of the load impedance $Z_{S0}$) as the center, as indicated by a curve B. In this case, even if a small matching error occurs due to variations in respective circuit components, the efficiency $\eta$ (and, therefore, the output) varies slightly. Conversely, when a Q value is large, as indicated by a curve A, the efficiency $\eta$ (and, therefore, the output) varies greatly, depending on a small matching error. Therefore, the Q value is set to be relatively small (that is, about 3 to 5), in consideration of a small matching error.

In the gas laser tube 4 as a load, however, the load impedance $Z_L$ is not limited prior to discharge (nonload state), as described above, and when the discharge is started, the load impedance $Z_L$ is abruptly decreased. That is, the load impedance is reduced to about 500 $\Omega$ at the operating point, and thus, during the discharge operation, the load impedance $Z_L$ is greatly changed.

In the gas laser tube 4 having a great change in the load impedance, the Q value is set to be about 3 to 5 in the conventional matching circuit, to establish a match at the operating point. With this technique, the load impedance $Z_L$ prior to discharge is not limited, and as long as a match at the operating point is established by one matching circuit, a large matching error occurs and thus a discharge will not occur when a predetermined power source voltage is applied.

To solve the above problem, a plurality of matching circuits are used, the power source voltage is boosted, or a pulse is superimposed on the power source voltage. In addition, a gas pressure of the laser tube is decreased in order to decrease the discharge start voltage. Nevertheless, the above countermeasures present other problems, such as the complexity of the laser arrangement.

The fifth embodiment of an RF discharge excitation laser apparatus according to the present invention is arranged to determine respective constants of the matching circuit such that the Q value used in the conventional technique is decreased (2 or less in practice) to facilitate the start of discharge upon application of the power source voltage, in order to improve the start characteristics, and that after the start of discharge, an operating point corresponding to a predetermined current command value is obtained and an automatic match is performed at the operating point.

That is, in this embodiment, the value of a constant Q required for setting the input capacitance $C_1$ is set to be 2 or less.

Figure 9:
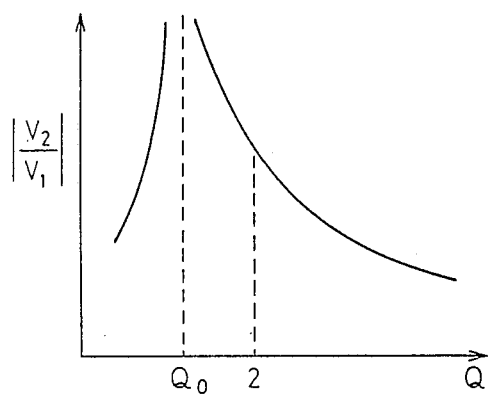
FIG. 9 is a view showing relationship between the constant and the boosting ratio when the impedance of a laser tube is not limited.

FIG. 9 shows the relationship between the Q value and a boosting ratio $V_2/V_1$ (where $V_1$ is an output voltage of the RF power source 1 and $V_2$ is a voltage applied to the laser tube 4) prior to the start of a discharge of the laser tube (that is, in a state wherein an impedance $Z_L$ of the laser tube 4 is not limited). When the Q value is decreased, the boosting ratio $V_2/V_1$ is abruptly increased. When a single matching circuit 2 was used, the discharge of the laser tube could not be smoothly started unless the Q value was at least 2 or less. This was found as a result of experimental and theoretical studies on AC discharge characteristics by the present inventor.

According to the present invention, when considering the above situation, the capacitance $C_1$ of the input capacitive element is set on the basis of equation (1); that is, $X_1 = 1/\omega C_1 = Z_0/Q$ (wherein $Z_0$ is the output impedance of the power source 1). The boosting ratio at the time of application of the power source voltage is increased to smoothly start the discharge of the laser tube 4.

According to the present invention, the output capacitance $C_2$ and the inductance L of the matching circuit 2 are set by equations (2) and (3) using the Q value of 2 or less, and the $Z_0$ and $Z_L$ values (that is, the load impedance values at the operating point):

$$X_2 = \frac{1}{\omega C_2} = \frac{Z_L}{\dfrac{Z_L}{Z_0}(Q^2 + 1) - 1}$$

$$X_L = \omega L = \frac{QZ_0}{Q^2 + 1}\left(1 + \frac{Z_L}{QX_2}\right)$$

After the start of discharge, an impedance match is automatically established at the operating point.

In the above first to fifth embodiments of an RF discharge excitation laser apparatus according to the present invention, the matching circuit 2 is exemplified by an $\pi$ matching circuit, but the matching circuit 2 in the RF discharge excitation laser apparatus according to the present invention is not limited to such a matching circuit. Further, the RF discharge excitation laser apparatus according to the present invention is not limited to a carbon dioxide layer, but is also applicable to any other gas laser such as an He-Ne gas laser, a CO (carbon monoxide) gas laser, and an excimer laser.

I claim:

1. An RF discharge excitation laser apparatus, comprising:
   a power source unit having an RF power source means with an output side for generating an RF voltage, and a matching circuit means operably connected to said RF power source output side;
   a laser emitting portion having a laser tube for emitting a laser beam;
   a power cable operably connected between said matching circuit means and said laser tube, said power cable having an output end being directly connected to said laser tube;
   wherein said power cable carries power generated from said RF power source to said laser emitting portion,
   wherein said matching circuit means matches an output impedance of said RF power source with an impedance of said laser tube connected to said output end of said laser tube, and
   wherein said RF discharge excitation laser and said matching circuit means can thereby be effectively adjusted because both said RF power source means and said matching circuit means are located within said power source unit.

2. An apparatus according to claim 1, wherein said power transmitting cable comprises a coaxial cable.

3. An apparatus according to claim 2, wherein said coaxial cable functions as a reactance element of said matching means.

4. An apparatus according to claim 3, wherein said matching means includes an inductance element connected in parallel on an RF power source side of said coaxial cable, and an electrostatic capacity of said coaxial cable is reduced by said inductance element.

5. An apparatus according to claim 1, wherein said matching circuit means includes a parallel resonant circuit connected to output terminals of said RF power source, and an impedance means which is sensed by the output terminals of said RF power source only as a resistance component.

6. An apparatus according to claim 1, wherein said matching means includes a boosting transformer having a primary winding connected to the output terminals of said RF power source, and said laser tube is connected to a secondary winding of said boosting transformer through said power transmitting cable means.

7. An apparatus according to claim 1, wherein said matching means includes a reactance network of inductance and capacitance elements.

8. An apparatus according to claim 7, wherein the input reactance of said matching means is set to be not less than ½ of the output impedance of said RF power source.

9. An apparatus according to claim 1, wherein said RF power source comprises a current inverter circuit.

* * * * *